United States Patent
Bodtker et al.

(10) Patent No.: US 10,676,126 B2
(45) Date of Patent: *Jun. 9, 2020

(54) ROTATION CONTROL ASSEMBLY FOR A STEERING COLUMN

(71) Applicant: STEERING SOLUTIONS IP HOLDING CORPORATION, Saginaw, MI (US)

(72) Inventors: Joen C. Bodtker, Gaines, MI (US); Melvin Lee Tinnin, Clio, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/206,423

(22) Filed: Nov. 30, 2018

(65) Prior Publication Data
US 2019/0092375 A1    Mar. 28, 2019

Related U.S. Application Data

(63) Continuation of application No. 15/293,900, filed on Oct. 14, 2016.

(51) Int. Cl.
B62D 5/00 (2006.01)
B62D 1/16 (2006.01)
B60R 21/203 (2006.01)

(52) U.S. Cl.
CPC ............... B62D 5/005 (2013.01); B62D 1/16 (2013.01); B60R 21/203 (2013.01)

(58) Field of Classification Search
CPC .......... B62D 5/005; B62D 1/16; B60R 21/203
See application file for complete search history.

(56) References Cited

U.S. PATENT DOCUMENTS

| 3,420,586 | A | * | 1/1969 | Gerner ..................... B62D 1/16 384/218 |
| 4,337,967 | A | | 7/1982 | Yoshida et al. |
| 4,691,587 | A | | 9/1987 | Farrand et al. |
| 5,240,284 | A | | 8/1993 | Takada et al. |

(Continued)

FOREIGN PATENT DOCUMENTS

| CN | 201240416 Y | 5/2009 |
| CN | 103448785 A | 12/2013 |

(Continued)

OTHER PUBLICATIONS

Gillespie, Thomas D.; "Fundamentals of Vehicle Dynamics"; Society of Automotive Enginers, Inc.; published 1992; 294 pages.

(Continued)

*Primary Examiner* — Faye M Fleming
(74) *Attorney, Agent, or Firm* — Dickinson Wright PLLC

(57) ABSTRACT

A rotation control assembly for a steering column assembly includes a steering shaft. The rotation control assembly also includes a driving tab rotatable with the steering shaft. The rotation control assembly further includes a driven tab rotatable relative to the steering shaft, the driving tab adapted to engage the driven tab upon rotation of the steering shaft. The rotation control assembly yet further includes an end stop positioned to engage the driven tab upon rotation of the driven tab to the end stop, engagement of the driven tab and the end stop limiting rotation of the steering shaft.

14 Claims, 7 Drawing Sheets

(56) References Cited

U.S. PATENT DOCUMENTS

| | | |
|---|---|---|
| 5,319,803 A | 6/1994 | Allen |
| 5,488,555 A | 1/1996 | Asgari et al. |
| 5,618,058 A | 4/1997 | Byon |
| 5,668,721 A | 9/1997 | Chandy |
| 5,893,580 A | 4/1999 | Hoagland et al. |
| 6,138,788 A | 10/2000 | Bohner et al. |
| 6,354,622 B1 | 3/2002 | Ulbrich et al. |
| 6,373,472 B1 | 4/2002 | Palalau et al. |
| 6,381,526 B1 | 4/2002 | Higashi et al. |
| 6,481,526 B1 | 11/2002 | Millsap et al. |
| 6,598,695 B1 | 7/2003 | Menjak et al. |
| 6,612,393 B2 | 9/2003 | Bohner et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 7,018,299 B2 | 3/2006 | Da Silva |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,055,409 B2 | 11/2011 | Tsuchiya |
| 8,069,745 B2 | 12/2011 | Strieter et al. |
| 8,079,312 B2 | 12/2011 | Long |
| 8,260,482 B1 | 9/2012 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,670,891 B1 | 3/2014 | Szybalski et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,227,531 B2 | 1/2016 | Cuddihy et al. |
| 9,233,638 B2 | 1/2016 | Lisseman et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,290,174 B1 | 3/2016 | Zagorski |
| 9,290,201 B1 | 3/2016 | Lombrozo |
| 9,308,857 B2 | 4/2016 | Lisseman et al. |
| 9,308,891 B2 | 4/2016 | Cudak et al. |
| 9,352,752 B2 | 5/2016 | Cullinane et al. |
| 9,360,865 B2 | 6/2016 | Yopp |
| 9,878,732 B2 * | 1/2018 | Urushibata ............... B62D 1/16 |
| 2003/0227159 A1 | 12/2003 | Muller |
| 2004/0204808 A1 | 10/2004 | Satoh et al. |
| 2005/0081675 A1 | 4/2005 | Oshita et al. |
| 2006/0244251 A1 | 11/2006 | Muller |
| 2007/0021889 A1 | 1/2007 | Tsuchiya |
| 2007/0241548 A1 | 10/2007 | Fong |
| 2008/0238068 A1 | 10/2008 | Kumar et al. |
| 2009/0256342 A1 | 10/2009 | Cymbal et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0288567 A1 | 11/2010 | Bonne |
| 2011/0098922 A1 | 4/2011 | Ibrahim |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2012/0136540 A1 | 5/2012 | Miller |
| 2012/0205183 A1 | 8/2012 | Rombold |
| 2012/0215377 A1 | 8/2012 | Takemura et al. |
| 2013/0325202 A1 | 1/2013 | Howard et al. |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2015/0002404 A1 | 1/2015 | Hooton |
| 2015/0051780 A1 | 1/2015 | Hahne |
| 2015/0120142 A1 | 1/2015 | Park et al. |
| 2015/0246673 A1 | 4/2015 | Tseng et al. |
| 2015/0251666 A1 | 7/2015 | Attard et al. |
| 2015/0324111 A1 | 9/2015 | Jubner et al. |
| 2015/0283998 A1 | 10/2015 | Lind et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207536 A1 | 7/2016 | Yamaoka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0362084 A1 | 12/2016 | Martin et al. |
| 2017/0293306 A1 | 10/2017 | Riefe et al. |
| 2017/0356487 A1 * | 12/2017 | Muntener ............... B62D 1/16 |
| 2018/0029632 A1 | 2/2018 | Bodtker et al. |
| 2018/0105198 A1 | 4/2018 | Bodtker et al. |

FOREIGN PATENT DOCUMENTS

| | | | |
|---|---|---|---|
| CN | 103569189 A | 2/2014 | |
| DE | 102015212857 A1 * | 1/2016 | ............... B62D 1/16 |
| EP | 2426030 A1 | 3/2012 | |
| JP | S60157963 A | 8/1985 | |
| JP | H10-194152 | 7/1998 | |
| JP | 2000-16316 | 1/2000 | |
| JP | 2007253809 A | 10/2007 | |
| WO | WO-2008120231 A2 * | 10/2008 | ............... B62D 1/16 |
| WO | 2010082394 A1 | 7/2010 | |

OTHER PUBLICATIONS

Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

Van Der Jagt, Pim; "Prediction of steering efforts during stationary or slow rolling parking maneuvers"; Jul. 2013, 20 pages.

Varunjikar, Tejas; Design of Horizontal Curves With DownGrades Using Low-Order Vehicle Dynamics Models; A Theisis by T. Varunkikar; 2011; 141 pages.

(56) References Cited

OTHER PUBLICATIONS

English translation of the First Office Action regarding related CN Application No. 2017109582707; dated Jul. 25, 2019; 11 pgs.

* cited by examiner

… (US 10,676,126 B2)

ROTATION CONTROL ASSEMBLY FOR A STEERING COLUMN

CROSS-REFERENCE TO RELATED APPLICATION

This application is a continuation of U.S. patent application Ser. No. 15/293,900, filed Oct. 14, 2016, the subject matter of which is incorporated herein by reference in its entirety.

BACKGROUND

The embodiments disclosed herein relate to steering column assemblies and, more particularly, to a rotation control assembly for steering column assemblies.

Steer-by-wire steering columns may not have a mechanical connection to a steering gear. The mechanical connection may be replaced by an artificial road feel device, typically a servo motor controlled to provide road force feedback to the driver. It can also provide enough force to indicate the end of wheel travel or lock-to-lock end stops. When the vehicle is powered down it may be desired to not draw battery power to provide the static steer efforts. In this situation, the steering wheel is easy to rotate. It may be possible to rotate the wheel beyond the wiring limits of a supplemental inflatable restraint (SIR) coil, thus severing the wire and making the vehicle non-functional or unsafe to drive.

SUMMARY OF THE INVENTION

In one embodiment of the disclosure, a rotation control assembly for a steering column assembly includes a steering shaft. The rotation control assembly also includes a driving tab rotatable with the steering shaft. The rotation control assembly further includes driven tab rotatable relative to the steering shaft, the driving tab adapted to engage the driven tab upon rotation of the steering shaft. The rotation control assembly yet further includes an end stop positioned to engage the driven tab upon rotation of the driven tab to the end stop, engagement of the driven tab and the end stop limiting rotation of the steering shaft.

In another embodiment of the disclosure, a rotation control assembly for a steering column assembly includes a steering shaft. The rotation control assembly also includes a fixed plate surrounding the steering shaft and fixedly coupled thereto to rotate with the steering shaft, the fixed plate having a protrusion extending therefrom and having a first rotation axis. The rotation control assembly further includes a driven wheel having a second rotation axis offset from the first rotation axis, the driven wheel defining a plurality of receiving features, at least one of the receiving features extending to a depth closer to the second rotation axis relative to the other receiving features, the protrusion engageable with the plurality of receiving features, engagement of the protrusion and the receiving feature having a shallower depth limiting rotation of the steering shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 7:
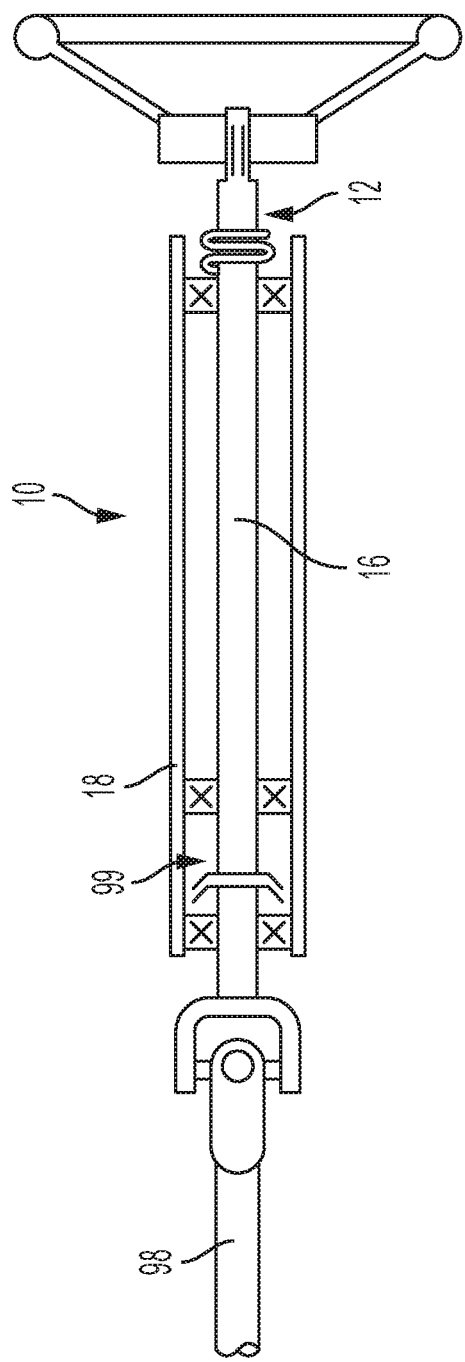
FIG. 7 is a perspective view of the steering column with an I-shaft decoupling device.

Referring now to the Figures, where embodiments will be described, without limiting same, FIGS. 1-4 illustrate a steering column assembly generally referenced with numeral 10. The steering column assembly 10 may be employed on various types of vehicles. In some embodiments, the steering column assembly 10 is employed in an automobile and is a steering column that may be mechanically disconnected from a steering gear (not shown). For example, a steer-by-wire steering system may benefit from the embodiments described herein. In other embodiments, the steering column is part of a mechanical steering system having an I-shaft 98 decoupling device 99, as shown in FIG. 7.

In some situations, a steering wheel (not shown) operatively coupled to the steering column assembly 10 is easy to rotate. It may be possible to rotate the wheel beyond the wiring limits of a supplemental inflatable restraint (SIR) coil, thus severing the wire and making the vehicle non-functional or unsafe to drive. To address this issue, a rotation control assembly 12 is provided. The rotation control assembly 12 limits the angular rotation of the steering column assembly 10 by providing an end stop 14 that mechanically stops the angular travel of the steering column assembly 10.

The steering column assembly 10 includes a steering shaft 16 that rotates upon input from a user via rotation of the steering wheel. The steering shaft 16 is disposed radially inward of, and rotates within, a column jacket 18 that remains rotationally stationary, relative to the steering shaft 16. The end stop 14 that provides a hard stop for rotational travel of the steering shaft 16 is operatively coupled to, or integrally formed with, the column jacket 18 and extends radially inwardly therefrom. Alternatively, the end stop 14 may be operatively coupled to, or integrally formed with, a different steering column housing structure.

A fixed plate 20 surrounds at least a portion of the steering shaft 16 and is operatively coupled to, or integrally formed with, the steering shaft 16 in a manner that allows the fixed plate 20 to rotate with the steering shaft 16. In the illustrated embodiment, the fixed plate 20 is a cylindrical ring that extends completely around the steering shaft 16, but it is to be appreciated that alternative shapes may be utilized in some embodiments. Extending from the fixed plate 20 is a driving tab 22. In some embodiments, the driving tab 22 extends radially outward from a radially outer surface 24 of the fixed plate 20. Additionally, the driving tab 22 extends from the fixed plate 20 in an axial direction that facilitates engagement of the driving tab 22 with a tab of an adjacent plate, as described in detail below.

At least one rotating plate 26 surrounds the steering shaft 16, but is free to rotate relative to the steering shaft 16, unlike the fixed plate 20. As with the fixed plate 20, the rotating plate(s) 26 may be cylindrical rings that extend completely around the steering shaft 16, but it is to be appreciated that alternative shapes may be utilized in some embodiments. As shown in the illustrated embodiments, a plurality of rotating plates may be employed. In particular, the illustrated embodiments disclose four rotating plates, but the number of rotating plates may be modified to adjust the angular rotation limit of the steering shaft 16, as will be appreciated from the description herein. Regardless of the number of rotating plates 26, each rotating plate 26 includes a driven tab 28 extending therefrom. In some embodiments, the driven tab 28 extends radially outward from a radially outer surface 30 of the rotating plate 26. Additionally, the driven tab 28 extends from the rotating plate 26 in an axial direction that facilitates engagement of the driven tab 28 with a tab of an adjacent plate or the end stop 14.

As shown, a spacer plate 32 may be provided between adjacent rotating plates 26 and/or between a rotating plate 26 and the fixed plate 20. The spacer plate(s) 32 are cylindrical rings in the illustrated embodiment and surround the steering shaft 16. The spacer plate 32 is free to rotate relative to the steering shaft 16 and may be easily removed in an axial direction to allow adjustment of the number of rotating plates 26 included in the assembly. A shaft bearing 34 axially constrains the rotating plate(s) 26, the fixed plate 20 and the spacer plate(s) 32 and surrounds the steering shaft 16. It is to be appreciated that other axial retention components may be employed to axially constrain the rotating plate(s) 26, the fixed plate 20 and the spacer plate(s) 32.

In operation, the fixed plate 20 rotates in response to rotation of the steering shaft 16. This is due to engagement of the driving tab 22 with a keyway defined by the steering shaft 16 in some embodiments. In other embodiments, the fixed plate 20 is coupled to the steering shaft 16 in a manner that produces simultaneous rotation of the steering shaft 16 and the fixed plate 20, such as a welded securement or the like. Rotation of the fixed plate 20 results in rotation of the driving tab 22 until engagement with the driven tab 28 of an adjacent rotating plate 26 occurs. Further rotation results in rotation of the driving tab 22 and the driven tab 28 until engagement of the driven tab 28 engages an adjacent driven tab 28. This continues until a driven tab 28 of the rotating plate 26 located axially closest to the end stop 14 occurs. Engagement of the driven tab 28 closest to the end stop 14 results in a hard stop of angular movement by the steering shaft 16, thus avoiding undesirable consequences of over-rotation of the steering shaft 16.

Figure 1:
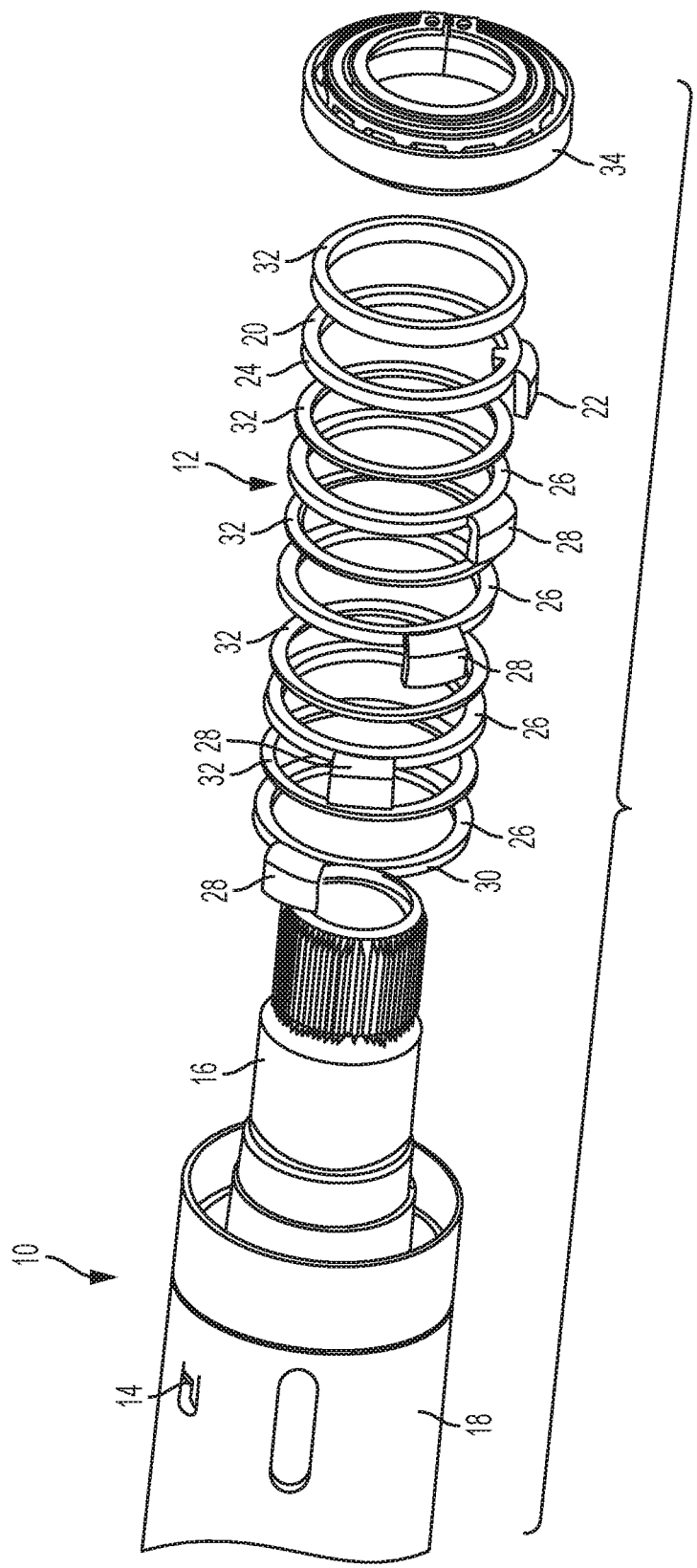
FIG. 1 is a perspective, partially disassembled view of a rotation control assembly for a steering column.
Figure 2:
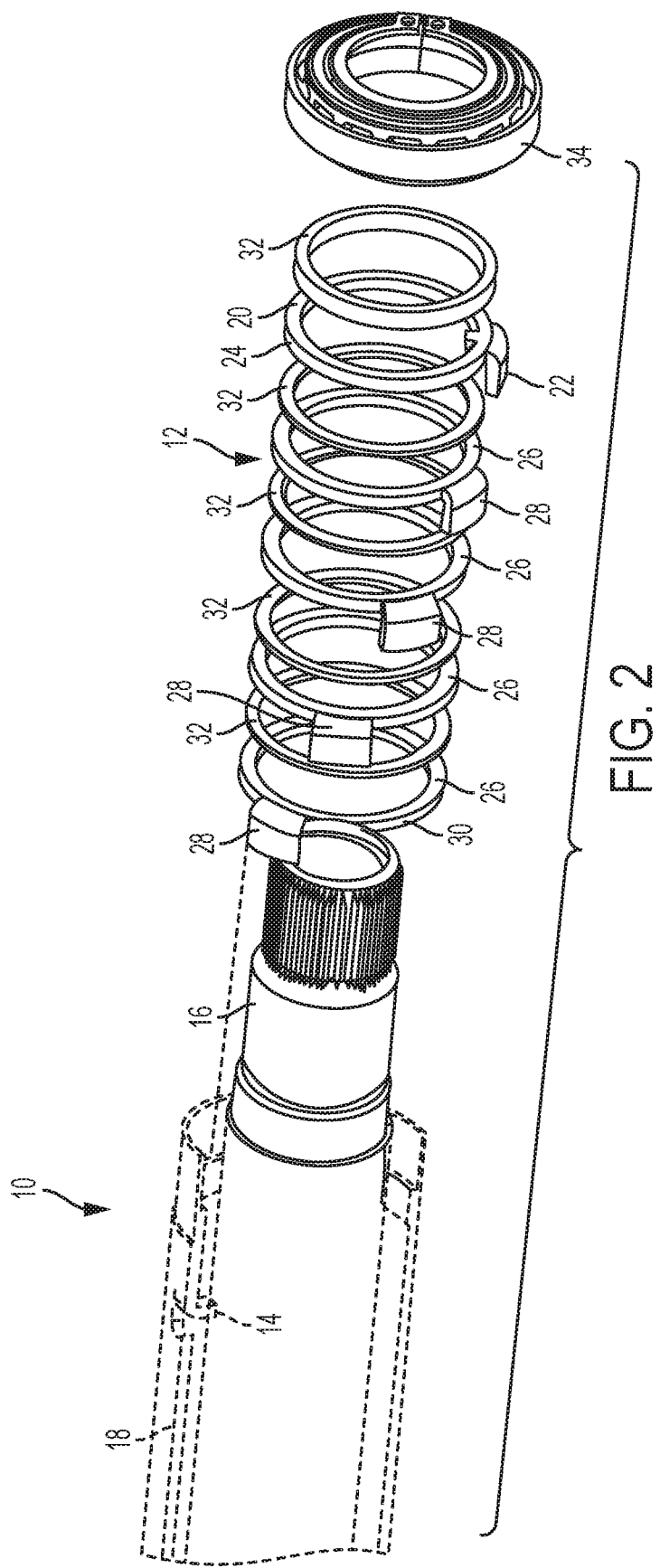
FIG. 2 is a perspective, cross-sectional, partially disassembled view of the rotation control assembly.
Figure 3:
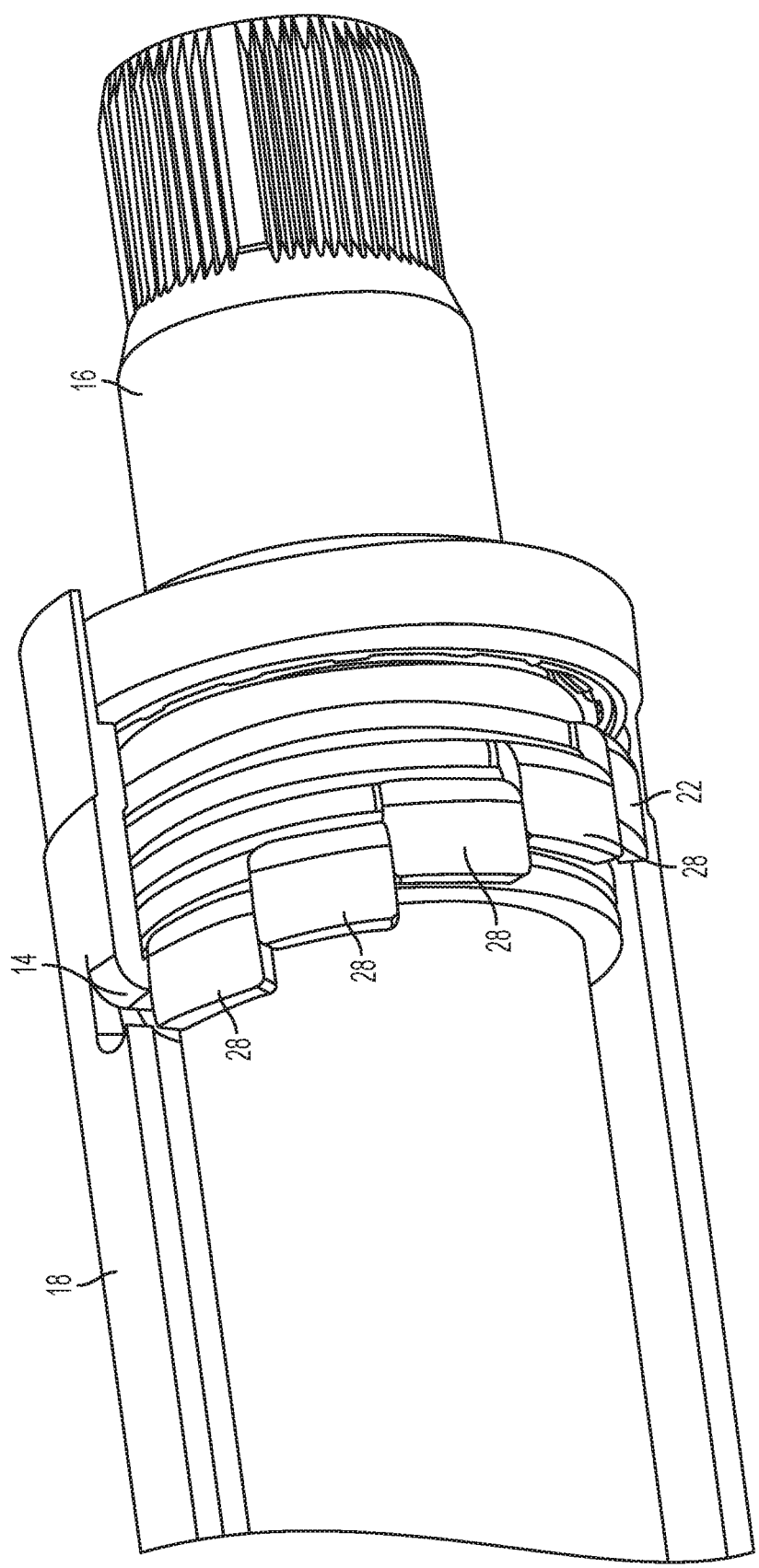
FIG. 3 is a perspective view of the rotation control assembly in a fully rotated position.
Figure 4:
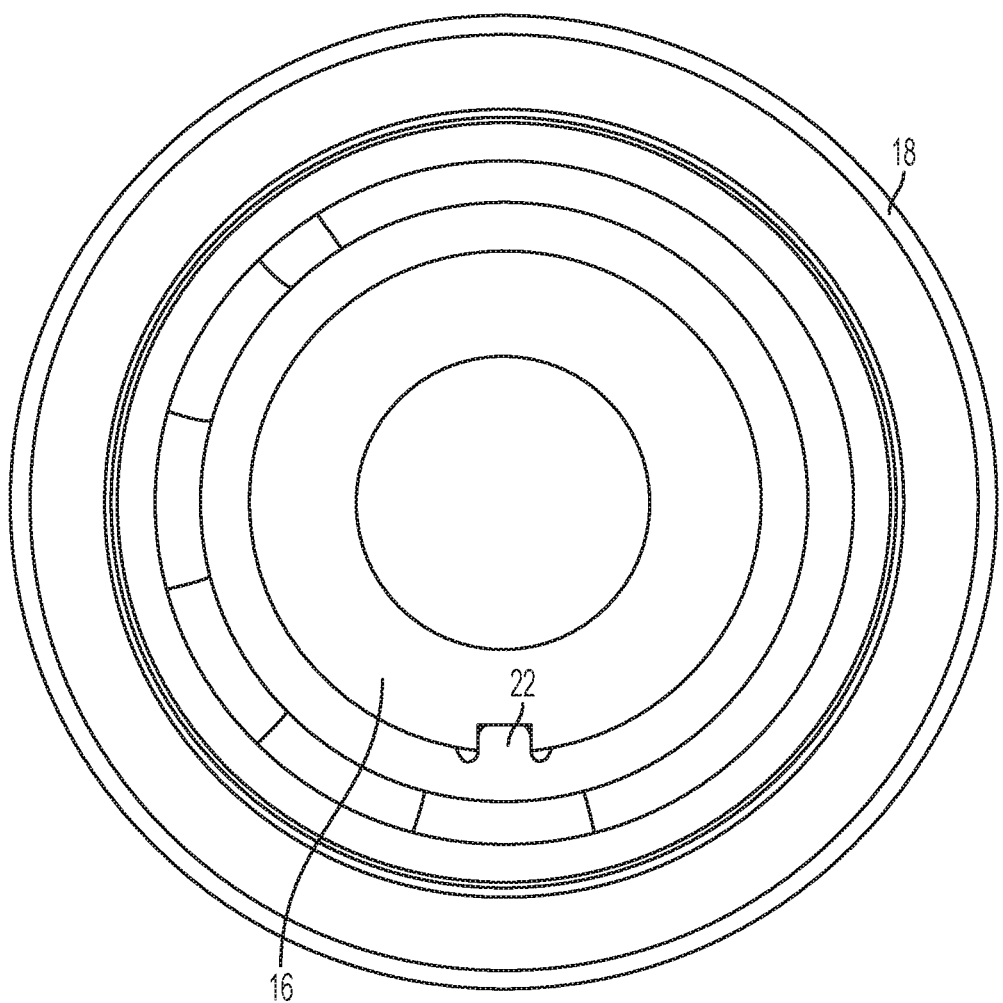
FIG. 4 is an end view of the rotation control assembly.
Figure 5:
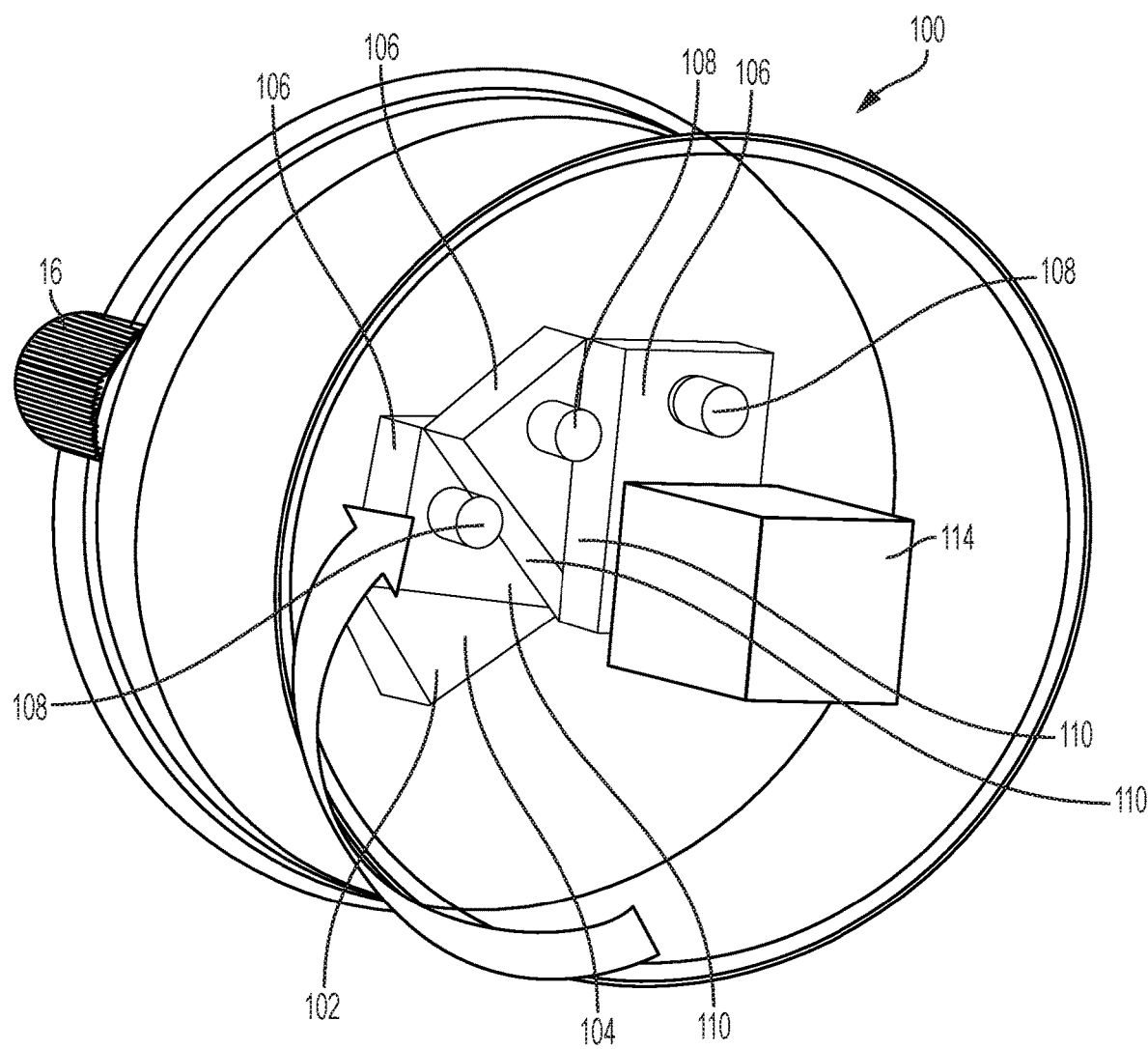
FIG. 5 is a perspective view of the rotation control assembly according to another aspect of the disclosure.

Referring now to FIG. 5, another embodiment of the rotation control assembly is illustrated and referenced with numeral 100. The rotation control assembly 100 includes a fixed plate 102 that is operatively coupled to, or integrally formed with, the steering shaft 16 in a manner that allows the fixed plate 102 to rotate with the steering shaft 16. A fixed plate pin 104 extending perpendicularly, or substantially perpendicularly, from the fixed plate 102 is provided. At least one rotating plate 106 surrounds the steering shaft 16, but is free to rotate relative to the steering shaft 16, unlike the fixed plate 102. As shown, a plurality of rotating plates 106 may be employed. As is the case with the embodiment of FIGS. 1-4, the number of rotating plates may be modified to adjust the angular rotation limit of the steering shaft 16. In each embodiment, the number of rotating plates determines the angular degree of rotational travel of the steering shaft 16. Each of the rotating plates 106 include a rotating plate pin 108 that extends perpendicularly, or substantially perpendicularly, from the rotating plate 106.

In operation, the fixed plate 102 rotates in response to rotation of the steering shaft 16. Rotation of the fixed plate 102 results in rotation of the fixed plate pin 104 until engagement with an engagement surface 110 of an adjacent rotating plate 106 occurs. Further rotation results in rotation of the fixed plate pin 104 and the rotating plate pin 108 until engagement of the rotating plate pin 108 engages an engagement surface 110 of an adjacent rotating plate 106. This continues until a rotating plate pin 108 of the rotating plate 106 located axially closest to the end stop 114 engages the end stop 114. Engagement of the rotating plate pin 108 closest to the end stop 114 results in a hard stop of angular movement by the steering shaft 16, thus avoiding undesirable consequences of over-rotation of the steering shaft 16.

Figure 6:
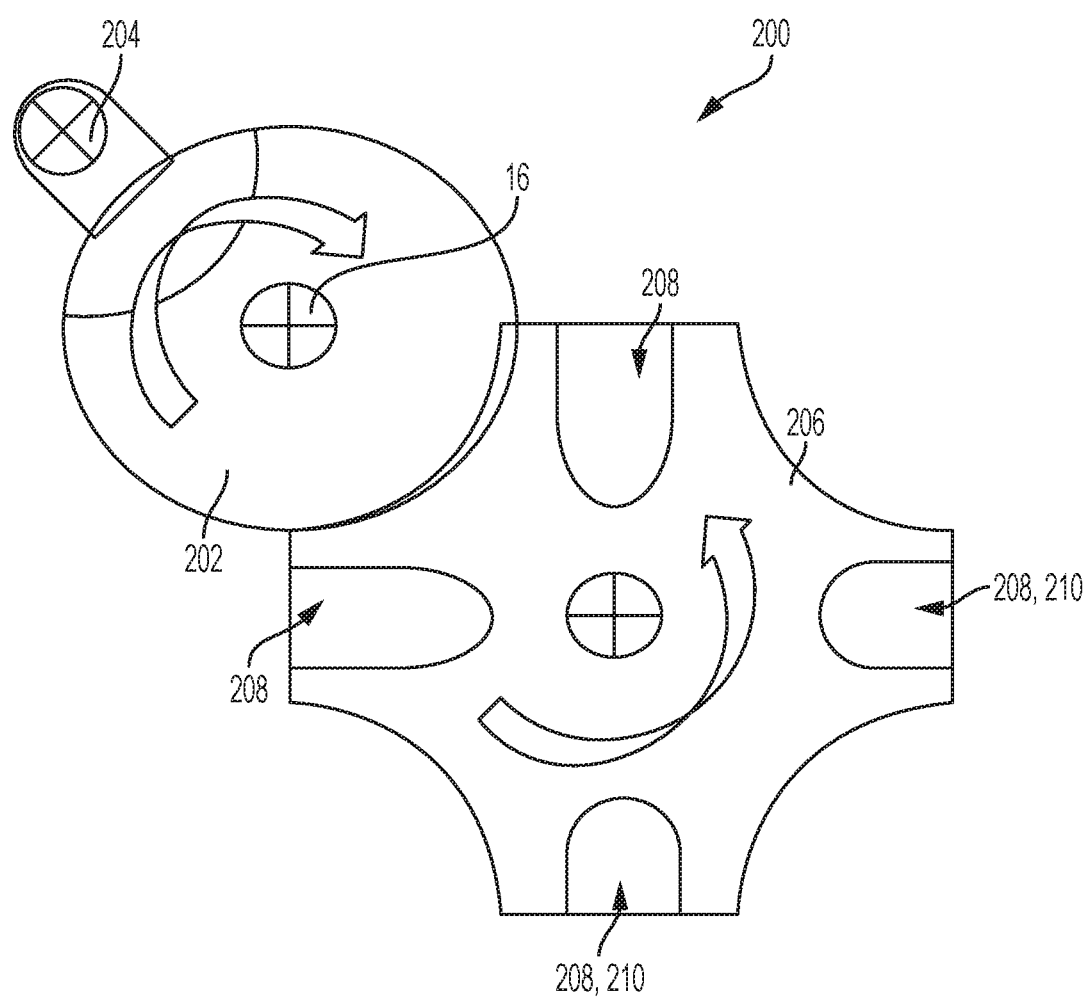
FIG. 6 is a schematic view of the rotation control assembly according to yet another aspect of the disclosure.

Referring now to FIG. 6, another embodiment of the rotation control assembly is illustrated and referenced with numeral 200. The rotation control assembly 200 includes a fixed plate 202 operatively coupled to, or integrally formed with, the steering shaft 16 in a manner that allows the fixed plate 202 to rotate with the steering shaft 16. A driving pin 204 extending perpendicularly, or substantially perpendicularly, from the fixed plate 202 is provided. A driven wheel 206 is disposed in proximity to the fixed plate 202 and rotates about an axis that is offset from, but parallel to, a rotation axis of the steering shaft 16 and the fixed plate 202. The driving pin 204 extends into one of a plurality of slots 208 of the driven wheel 206 to advance the driven wheel 206 by one step. This mechanism may be referred to as a Geneva gear that translates a continuous rotation of the steering shaft 16 and the fixed plate 202 into an intermittent rotary motion of the driven wheel 206. The fixed plate 202 may also have a raised blocking disc that locks the driven wheel 206 in position between steps.

In operation, as the steering shaft 16 rotates, the driving pin 204 engages one of the slots 208 of the driven wheel 206. As shown, some of the slots 208 extend radially deeper into the driven wheel 206 relative to other slots 208. The deeper slots allow continued rotation of the driven wheel 206 and consequently the fixed plate 202 and the steering shaft 16. The shallower slots do not allow continued rotation and are therefore considered end stops 210. The steering shaft 16 is free to reverse direction without binding or impulse locking.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A rotation control assembly for a steering column assembly comprising:
   a steering shaft;
   a driving tab rotatable with the steering shaft;
   a driven tab rotatable relative to the steering shaft, the driving tab adapted to engage the driven tab upon rotation of the steering shaft; and
   an end stop positioned to engage the driven tab upon rotation of the driven tab to the end stop, engagement of the driven tab and the end stop limiting rotation of the steering shaft, wherein the steering column assembly comprises a steering column that is mechanically decoupled from a steering gear, wherein the steering column assembly is a mechanical steering system having an I-shaft decoupling device.

2. The assembly of claim 1, wherein the steering column assembly is a steer-by-wire assembly.

3. The assembly of claim 1, wherein the end stop extends from a structure disposed radially outward of the steering shaft, the structure comprising a column housing.

4. A rotation control assembly for a steering column assembly comprising:
   a steering shaft;
   a driving tab rotatable with the steering shaft;
   a driven tab rotatable relative to the steering shaft, the driving tab adapted to engage the driven tab upon rotation of the steering shaft;
   an end stop positioned to engage the driven tab upon rotation of the driven tab to the end stop, engagement of the driven tab and the end stop limiting rotation of the steering shaft, wherein the driven tab extends from a rotating plate, the rotating plate is one of a plurality of rotating plates, each rotating plate surrounding the steering shaft and rotatable relative to the steering shaft, each rotating plate having a driven tab extending from the respective rotating plate, the driving tab engageable with one of the driven tabs to rotate the rotating plates; and
   at least one spacer plate surrounding the steering shaft, the at least one spacer plate disposed between the plurality of rotating plates.

5. The assembly of claim 4, wherein the angular rotation limit of the steering shaft is adjustable by modifying the number of the plurality of rotating plates.

6. The assembly of claim 4, wherein the end stop extends from a structure disposed radially outward of the steering shaft, the structure comprising a column housing.

7. A rotation control assembly for a steering column assembly comprising:
   a steering shaft;
   a driving tab rotatable with the steering shaft;
   a driven tab rotatable relative to the steering shaft, the driving tab adapted to engage the driven tab upon rotation of the steering shaft; and
   an end stop positioned to engage the driven tab upon rotation of the driven tab to the end stop, engagement of the driven tab and the end stop limiting rotation of the steering shaft, wherein the driven tab extends from a rotating plate, the rotating plate is one of a plurality of rotating plates, each rotating plate surrounding the steering shaft and rotatable relative to the steering shaft, each rotating plate having a driven tab extending from the respective rotating plate, the driving tab engageable with one of the driven tabs to rotate the rotating plates, wherein the angular rotation limit of the steering shaft is adjustable by modifying the width of the driven tabs.

8. The assembly of claim 7, wherein the angular rotation limit of the steering shaft is adjustable by modifying the number of the plurality of rotating plates.

9. The assembly of claim 7, wherein the end stop extends from a structure disposed radially outward of the steering shaft, the structure comprising a column housing.

10. A rotation control assembly for a steering column assembly comprising:
    a steering shaft;
    a driving tab rotatable with the steering shaft;
    a driven tab rotatable relative to the steering shaft, the driving tab adapted to engage the driven tab upon rotation of the steering shaft;
    an end stop positioned to engage the driven tab upon rotation of the driven tab to the end stop, engagement of the driven tab and the end stop limiting rotation of the steering shaft;
    a fixed plate surrounding the steering shaft and fixedly coupled thereto to rotate with the steering shaft, the driving tab integrally formed with the fixed plate and engaged with a keyway defined by the steering shaft to rotatably drive the driving tab during rotation of the steering shaft; and
    a spacer plate disposed between the fixed plate and the rotating plate.

11. The assembly of claim 10, wherein the end stop extends from a structure disposed radially outward of the steering shaft, the structure comprising a column housing.

12. A rotation control assembly for a steering column assembly comprising:
    a steering shaft;
    a driving tab rotatable with the steering shaft;
    a driven tab rotatable relative to the steering shaft, the driving tab adapted to engage the driven tab upon rotation of the steering shaft; and
    an end stop positioned to engage the driven tab upon rotation of the driven tab to the end stop, engagement of the driven tab and the end stop limiting rotation of the steering shaft, wherein the end stop extends from a structure disposed radially outward of the steering shaft, the structure comprising a steering column jacket.

13. A rotation control assembly for a steering column assembly comprising:
    a steering shaft;
    a fixed plate surrounding the steering shaft and fixedly coupled thereto to rotate with the steering shaft, the fixed plate having a protrusion extending therefrom and having a first rotation axis; and
    a driven wheel having a second rotation axis offset from the first rotation axis, the driven wheel defining a plurality of receiving features, at least one of the receiving features extending to a depth closer to the second rotation axis relative to the other receiving features, the protrusion engageable with the plurality of receiving features, engagement of the protrusion and the receiving feature having a shallower depth limiting rotation of the steering shaft.

14. The assembly of claim 13, wherein the steering column assembly is a steer-by-wire assembly.

* * * * *